Oct. 27, 1953
P. KETELSEN
2,656,899
APPARATUS FOR SUPPLYING A LIQUID TO
A FLUID PRESSURE MEDIUM UNDER FLOW
Filed May 11, 1951
2 Sheets-Sheet 1
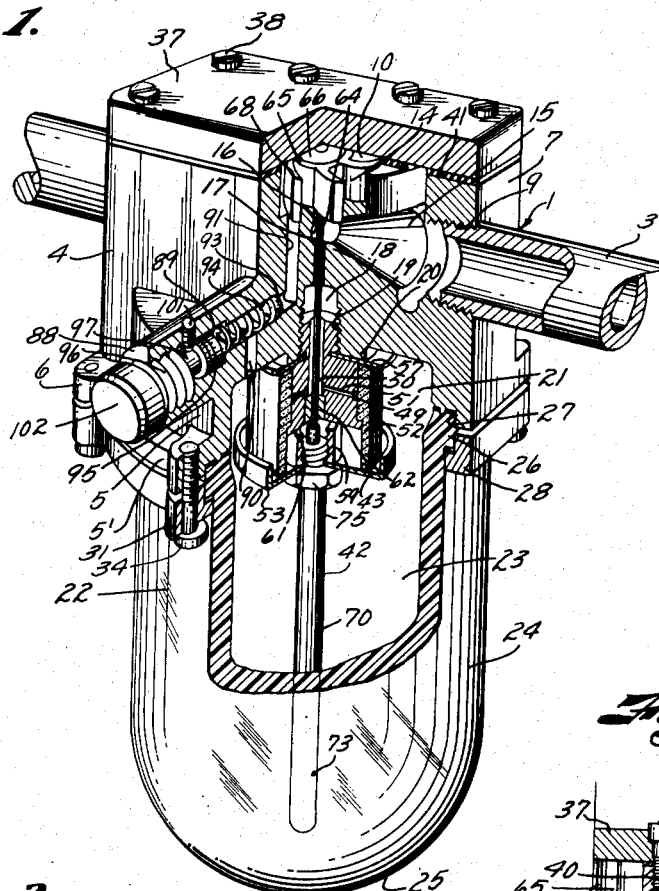
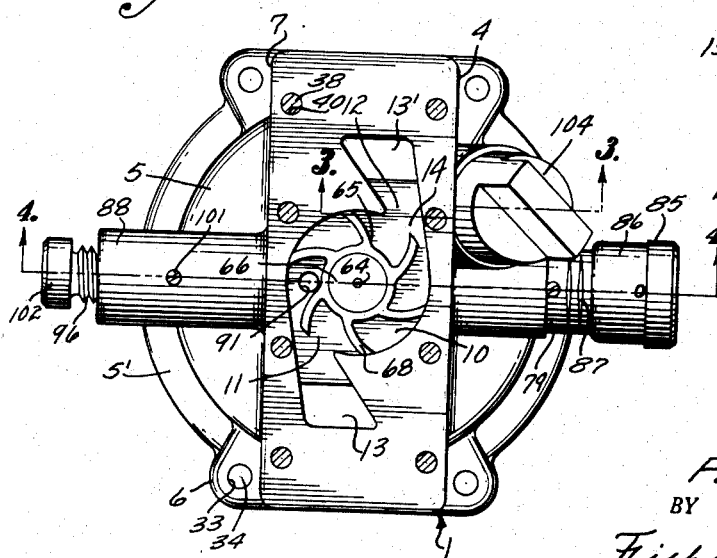
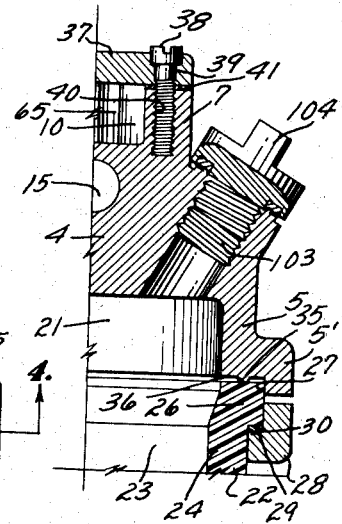
INVENTOR.
Peter Ketelsen
BY
Fishburn + Mullendore
ATTORNEYS Oct. 27, 1953
P. KETELSEN
2,656,899
APPARATUS FOR SUPPLYING A LIQUID TO
A FLUID PRESSURE MEDIUM UNDER FLOW
Filed May 11, 1951
2 Sheets-Sheet 2
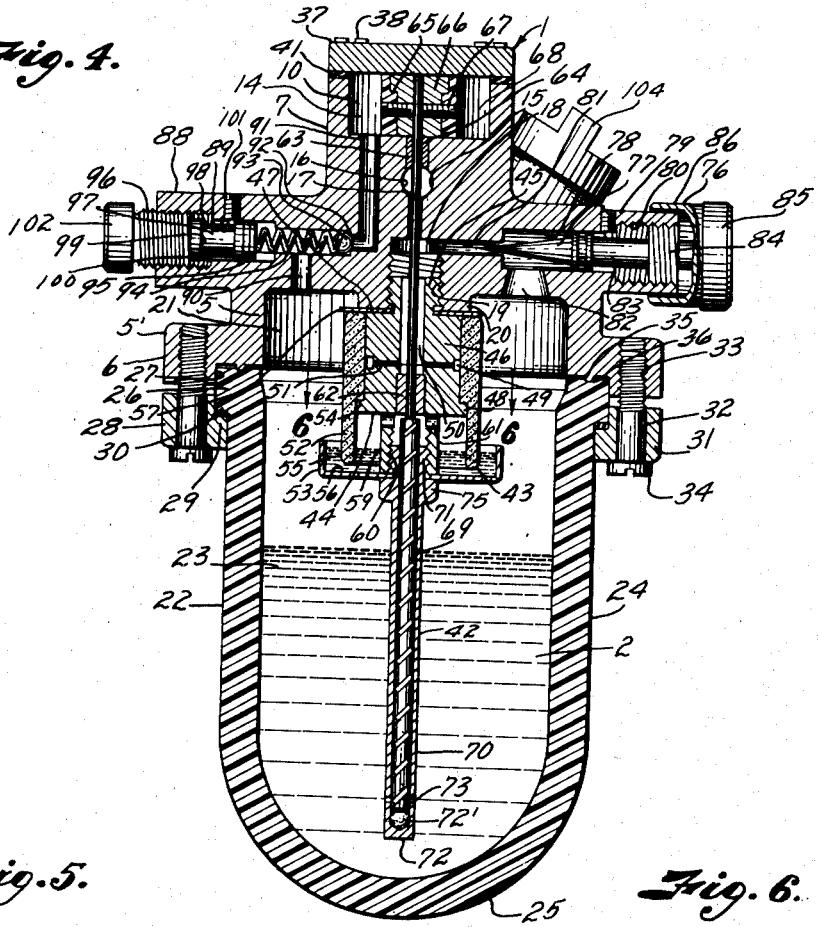
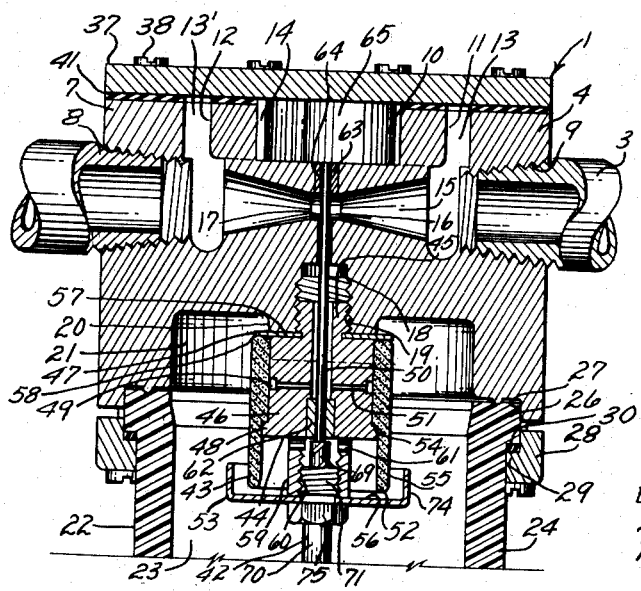
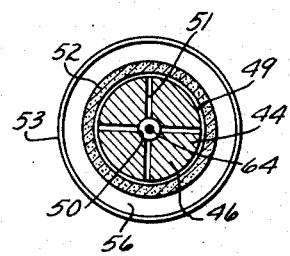
INVENTOR.
Peter Ketelsen
BY
Fishburn + Mullendore
ATTORNEYS.

Patented Oct. 27, 1953

2,656,899

UNITED STATES PATENT OFFICE 2,656,899

APPARATUS FOR SUPPLYING A LIQUID TO A FLUID PRESSURE MEDIUM UNDER FLOW

Peter Ketelsen, Wichita, Kans.

Application May 11, 1951, Serial No. 225,788

14 Claims. (Cl. 184—55)

1

This invention relates to an apparatus for supplying a liquid to a fluid pressure medium under flow. For example, a lubricant into a stream of compressed air being delivered to a pneumatically operated mechanism which requires lubrication of the working parts that are contacted by the air.

The principal object of the invention is to provide for controlled injection of lubricant in a manner to supply the exact amount required and thereby avoid waste and assure optimum efficiency of the machine being operated.

Another object of the invention is to supply the lubricant in a finely atomized or substantially vaporous form therefore assuring uniform entrainment of the liquid particles in the flowing stream of pressure medium.

Other objects of the invention are to provide a device which functions responsive to flow of air at the time that the supplied machine is in operation; to provide a pump actuated by flow of the pressure medium for supplying the liquid in ample volume to a capillary feeder from which the desired amount of liquid is aspirated into the flow of pressure medium; to provide means for controlling the aspirating effect of the pressure medium on the capillary feeder; to provide a device that is non-clogging and positive in operation; and to provide a device wherein the working parts are readily accessible for inspection and replacement.

In accomplishing these and other objects of the invention hereinafter pointed out, I have provided improved structure, the preferred form of which is illustrated in the accompanying drawings, wherein:

Fig. 1 is a perspective view of a device constructed in accordance with the present invention and connected to an air supply line for feeding a lubricant into the air flow through the line, parts of the device being broken away and in cross section to better illustrate the construction and arrangement of the flow passageways.

Fig. 2 is a horizontal section taken at the joint between the body of the device and the cover plate for the impeller chamber.

Fig. 3 is a fragmentary view on the line 3—3, Fig. 2, particularly illustrating the fill opening for supplying lubricant to the container, the closure plug shown as closing the fill opening.

Fig. 4 is a vertical section through the device on the line 4—4, of Fig. 2.

Fig. 5 is a similar view through the upper portion of the device taken at right angles to the section 4—4.

2

Fig. 6 is a section through the capillary feeder on the line 6—6 of Fig. 4.

Referring more in detail to the drawings:

1 designates a device constructed in accordance with the present invention for feeding a liquid such as a lubricant indicated at 2 to a fluid pressure medium, for example compressed air flowing through a pipe line 3 leading from a source of supply (not shown) to actuate a pneumatic machine or the like (also not shown). The device 1 comprises a head 4 having a substantially circular base portion 5 encircled by a flange 5' which is provided at intervals with outwardly projecting ears 6. The head 4 also includes a transverse portion 7 that extends upwardly from the base portion 5. The portion 7 of the head has the ends thereof provided with internally threaded openings 8 and 9 for connecting adjacent ends of the fluid pressure supply line 3, as best shown in Figs. 1 and 5. Formed in the top of the portion 7 of the head, in coaxial relation with the circular base portion 5 at a point above the pipe connections, is a rotor chamber 10 having tangentially disposed jet-shaped inlet and outlet ports 11 and 12, respectively, connected with the openings 8 and 9 by passages 13 and 13', as best shown in Figs. 2 and 5, to provide a main flow passageway 14 for the pressure medium.

The portion 7 of the head also has a secondary passageway 15 which interconnects the passages 13 and 13' substantially coaxially with the openings 8 and 9. The secondary passageway 15 is of Venturi shape in that it has an intermediate constriction 16 and outwardly flaring ends for increasing velocity of flow across a port 17 which leads from an axial recess 18 in the head. The recess 18 has an internally threaded portion 19 extending through an axial boss 20 which is located within a larger recess 21 that is provided within the base portion 5, as best shown in Figs. 1, 4 and 5.

The recess 21 cooperates with a cup shape receptacle 22 for forming a supply chamber 23 to contain the supply of lubricant 2. The receptacle 22 is preferably formed of transparent material and has an annular wall 24 rounding into a bottom 25. The wall 24 has a flange-like rim 26 that seats within a counter-recess 27 in the cylindrical portion 5 of the body member 4. The rim-like flange is retained in seated position by a clamping ring 28 encircling the wall 24 and having an inwardly extending annular ledge 29 engaging under the shoulder 30 provided by the flange-like rim 26. The clamping ring 28 has outwardly projecting ears 31, corresponding with the ears 6 and which are provided with openings 32 registering with threaded openings 33 in the ears 6 to pass fastening devices, such as screws 34 for securing the members 22 and 4 together. To secure a leak tight joint between the rim 26 of the top of the counter-recess 27, the head is provided with a rib 35 that engages in a groove 36 in the upper face of the rim 26.

The top portion 7 is provided with a plate 37 for closing the rotor chamber 10 and the upper ends of the passages 13 and 13', the plate being secured by fastening devices such as screws 38 that extend through suitable openings 39 in the plate and into threaded openings 40 that are provided in the portion 7 as best shown in Fig. 3. A gasket 41 is preferably inserted between the upper face of the portion 7 and the lower face of the closure plate 37.

In accordance with the present invention, the lubricant 2 is supplied to the flow of pressure medium in a finely atomized or vaporized form so that it is uniformly dispersed in the pressure medium. In accomplishing this result, the device is provided with a pump 42 for removing the lubricant from the container and supplying it in excess volume to a capillary feeder 43 from which the lubricant is drawn through the recess 18 and port 17 into the Venturi shaped secondary passageway 15 responsive to the aspirating effect of the pressure medium flowing through the restricted portion 16.

Suspended within the recess 21 and the upper portion of the chamber 23 is a fitting 44 having an externally threaded neck 45 engaging the threaded portion of the recess 18 and having a substantially cylindrical body portion 46 that forms an annular shoulder 47 with the neck 45. The body portion 46 has an annular shoulder 48 and an intermediate annular groove 49 that is connected with an axial port 50 through radial ports 51 as best shown in Figs. 4 and 6.

The port 50 extends coaxially through the neck 45 and connects the radial ports with the recess 18. Engaged over the body portion 46 of the fitting 44 is a sleeve 52 that is formed of porous material forming capillaries through which lubricant is conducted from a cup or tray 53 to the annular groove 49. The sleeve 52 is supported on an internal shoulder 54 that seats on the shoulder 48 so as to suspend skirt portion 55 of the sleeve slightly above the bottom 56 of the cup 53, so as to permit free flow of lubricant thereunder. The sleeve 52 is retained in position by means of a washer 57, that encircles the neck 45 and has a marginal rim 58 that projects over the upper end of the sleeve.

The pump mechanism is operated by a rotor in the rotor chamber as now to be described. Formed on the depending portion of the fitting 44 is a reduced extension 59 having an internally threaded axial recess 60 connected with radial ports 61 that open through the wall of the extension at points spaced above the bottom 56 of the cup 53. The port 50 is counterbored from the recess 60 to accommodate a bearing 62 that cooperates with a similar bearing 63 located between the rotor chamber and the restricted portion 16 of the secondary passageway to journal a vertical shaft 64 that extends through the axial ports and into the rotor chamber to mount the rotor 65 by which the shaft is turned responsive to flow of pressure fluid through the rotor chamber.

The rotor 65 includes a hub 66 that is secured to the shaft by set screws 67 as best shown in Fig. 4. Extending from the hub 66 are blades 68 movable across the inlet port responsive to velocity flow of pressure medium as directed by the nozzle-like shape of the ports 11 and 12. The shaft 64 extends downwardly within the lubricant compartment and has a spiral thread 69 that rotates within a tube 70 having its upper end 71 threaded into the threaded portion of the recess 60. The lower end of the tube is closed as indicated at 72 and seats a ball bearing 72' on which the end of the shaft bears. Provided in the tube above the bearings 72' are ports 73 for admitting the lubricant from the lubricant chamber into the shaft where it is picked up by the spiral thread and elevated thereby into the upper portion of the recess 60 for discharge through the ports 61 into the cup 53. It is thus obvious that whenever a flow of pressure fluid is established through the pipe line, the rotor is operating the pump for lifting a supply of lubricant into the cup. The cup is provided with a peripheral flange 74 of sufficient height to maintain the level of lubricant above the lower end of the capillary sleeve. The surplus lubricant overflows the flange 74 and returns to the lubricant compartment. The tube 69 forms a support for the cup 53 in that it is provided with a collar 75 that bears against the bottom of the cup and clamps it against the reduced extension of the fitting 46 as best shown in Fig. 4.

A portion of the lubricant in the cup is absorbed by the sleeve and travels upwardly through the sleeve by capillary action to collect in the recess 49. The velocity flow of the portion of the pressure fluid through the secondary passage exerts an aspirating effect on a liquid collecting in the annular recess 49 so as to draw the lubricant in finely divided state through the ports 51—50, recess 18 and port 17 into the restricted portion of the Venturi passage where it is picked up by the pressure fluid and dispersed into the by-passed pressure fluid to be carried therewith into the machine being operated thereby.

In order to control the aspirating effect on the lubricant and thereby control the amount of lubricant, the feeder means is provided for controlling the amount of aspiration of the lubricant as now to be described.

The head of the lubricator carries a regulating mechanism 76 including a valve 77 mounted in a bore 78 formed in an extension 79 and which has an internally threaded counter-bore 80. The bore 78 connects with the recess 18 through a port 81 and with the lubricant containing chamber through a port 82. The valve 77 has a stem 83 provided with a threaded collar 84 engaging the internal threads of the counter-bore so as to retain the valve in adjusted position and thereby regulate the amount of air that may be drawn through the port 81 responsive to flow of pressure medium. The stem 83 is adapted to be turned by means of a knob 85 having a skirt portion 86 rotatable around the extension 79. The terminal edge of the skirt portion forms a gauge by which the valve is regulated according to a series of calibrations 87 that are provided on the circumference of extension 79, as best shown in Fig. 2.

In order to admit pressure medium to the lubricant chamber and to prevent drawing of vacuum therein the body member 4 has an extension 88 opposite the extension 79 and which is provided with a bore 89 forming a connection with a port 90 opening into the lubricant chamber and with a port 91 opening into the inlet of the rotor chamber whereby pressure medium from the rotor chamber is admitted into the lubricant chamber. In order to control the air admitted into the lubricant chamber a valve seat 92 is formed at the juncture of the bore 89 with the port 91 for seating a ball check valve 93 that is normally retained in seated position responsive to action of a coil spring 94 which is contained in the bore and has its opposite end bearing against the stem 95 of adjusting screw 96. The stem 95 has an annular recess 97 to form stops 98 and 99 to engage a terminal 100 and a set screw 101 that is threaded into the head. The adjusting screw 96 has an external head 102 by which it may be rotated to adjust the action of the spring.

The lubricant is supplied to the lubricant chamber through an opening 103 in the head 4 and which is normally closed by a plug 104 that is threaded into the threaded outer end of the opening 103.

Assuming that the lubricator has been installed in a pipe line which supplies a pressure medium to a machine for actuation thereby and that the receptacle 22 is supplied with a quantity of lubricant, the operation of the lubricator is as follows.

When the machine is actuated a flow of pressure medium is established through the pipe line 3. When this occurs, a major flow of pressure medium passes through the main passage 14 to effect jet action against the blades of the rotor and produce rotation of the shaft 64 at substantially high speed to cause the spiral portion thereof to elevate the lubricant into the cup 53 by way of the port 61. The lubricant fills the cup and the surplus overflows the flange of the cup and returns to the body of lubricant in the receptacle. The flow of lubricant through the port 73 and into the pump is promoted by the pressure medium acting on the body of lubricant by way of the ports 91, 94 and 90. A portion of the lubricant in the cup is conducted by capillary action through the sleeve 52 into the groove 49.

Simultaneously with flow through the main passageway, a portion of the pressure medium passes through the secondary or Venturi shaped passageway to produce an aspirating effect in the port 17, recess 18 and ports 51 and 50 to draw the lubricant from the groove 49 and disperse it into the pressure medium on the discharge side in a finely divided form for delivery with the pressure medium to the machine being operated.

The amount of lubricant fed to the stream of pressure medium may be controlled by turning the knob 85 to adjust the aspirating effect on the lubricant within the recess 18. For example, valving the pressure medium admitted through the port 82 increases the aspirating effect on the lubricant to draw a greater amount of lubricant into the pressure medium and reducing the valving effect reduces the amount of the aspirating effect on the lubricant so that a less amount of lubricant is delivered into the pressure medium. This adjustment may be readily effected according to the calibrations by turning the knob so that the skirt portion thereof registers with the proper mark 87. When the machine is stopped, the flow of pressure medium ceases and also operation of the lubricator.

It is thus obvious that the lubricator is operated only when pressure medium is flowing and the lubricant is supplied only when it is needed.

It is also obvious that I have provided a lubricator that is of simple construction and automatically operated to assure a proper amount of lubricant being delivered into the pressure medium and that the pressure medium is delivered in finely divided and effective form.

What I claim and desire to secure by Letters Patent is:

1. A device of the character described including a receptacle for a fluid to be dispersed in a flow of fluid pressure medium, a head connected with the receptacle and having a passage provided with an inlet and an outlet for the fluid pressure medium, aspirating means in said head for effecting discharge of liquid into the pressure medium, a capillary feeder having connection with the aspirating means for feeding the liquid to the aspirating means, a pump having an inlet in connection with the receptacle and an outlet in connection with the capillary feeder, said pump including a rotary element for elevating fluid from the inlet to the outlet, actuating means in said head and in path of flow of the pressure medium and having a driving connection with the rotary element.

2. A device of the character described including a receptacle for a fluid to be dispersed in a flow of fluid pressure medium, a head connected with the receptacle and having main and secondary passages provided with a common inlet and a common outlet for the fluid pressure medium, aspirating means in said head for effecting discharge of liquid into the pressure medium in the secondary passage, a capillary feeder having connection with the aspirating means for feeding the liquid to the aspirating means, a pump having an inlet in connection with the receptacle and an outlet in connection with the capillary feeder, motor means in the main flow passage actuated by the flow of pressure medium therethrough, and a driving connection between the motor and pump for actuating the pump.

3. A device of the character described including a receptacle for a fluid to be dispersed in a flow of fluid pressure medium, a head connected with the receptacle and having a passage provided with an inlet and an outlet for the fluid pressure medium, aspirating means in said head for effecting discharge of liquid into the pressure medium, a capillary feeder having connection with the aspirating means for feeding the liquid to the aspirating means, a pump having an inlet in connection with the receptacle and an outlet in connection with the capillary feeder, means in said head and in path of flow of the pressure medium for actuating the pump, and duct means in said head and interconnecting the flow passage with the receptacle for maintaining pressure on the liquid in the receptacle to maintain the supply of liquid to the pump.

4. A device of the character described including a receptacle for a fluid to be dispersed in a fluid pressure medium, a head connected with the receptacle and having a passage provided with an inlet and an outlet for the fluid pressure medium, aspirating means in said head for effecting discharge of liquid into the pressure medium, a capillary feeder having connection with the aspirating means for feeding the liquid to the aspirating means, a pump having an inlet in connection with the receptacle and an outlet in connection with the capillary feeder, means actuated by flow of pressure medium for actuating the pump, duct means in said head and interconnecting the flow passage with the receptacle for maintaining pressure on the liquid in the receptacle to maintain the supply of liquid to the pump, said head having a flow duct between the receptacle and the aspirating means, and a valve in said duct for controlling the flow pressure medium to regulate the amount of liquid aspirated into the pressure medium.

5. In a lubricator for feeding lubricant to a pressure medium, the combination of means for containing a body of lubricant, aspirating means for feeding lubricant into the flow of pressure medium, capillary means for feeding lubricant to the aspirating means, a pump having an inlet connection with a lubricant containing means and an outlet connection with said capillary means for supplying lubricant from said lubricant containing means to the capillary means, means separate from the pump for supplying the pressure medium to the lubricant containing means to promote delivery of the lubricant to the pump, and valve means for admitting pressure medium from said lubricant to the aspirating means to control the amount of lubricant aspirated from the capillary means.

6. In a lubricator for feeding lubricant to a pressure medium the combination of means for containing a body of lubricant and having a main flow duct and a secondary duct for said pressure medium, aspirating means in said secondary duct for feeding lubricant into the flow of pressure medium, capillary means for feeding lubricant to the aspirating means, a pump having an inlet connection with a lubricant containing means and an outlet connection with said capillary means for supplying lubricant from said lubricant containing means to the capillary means, and means in the main flow duct and actuated by flow of pressure medium through said duct for actuating the pump.

7. A lubricator including a receptacle for containing a lubricant, a head connected with the receptacle and having a Venturi shaped passage and a main passage by-passing the Venturi shaped passage for dividing flow of a pressure medium through said head, said head having a rotor chamber in the main passageway, a rotor in said chamber adapted to be actuated by velocity flow through the main passageway, a shaft journalled in said head and connected with the rotor, said shaft having a spiral portion depending into the receptacle, aspirating means carried by the head and having an inlet and an outlet into the Venturi passage, a cup in position to receive lubricant elevated by said spiral portion of the shaft, and capillary means having a portion depending into the cup and having a portion carried by the aspirating means in covering relation with said inlet to the aspirating means for conducting lubricant from the cup to said aspirating means.

8. A lubricator including a receptacle for containing a lubricant, a head connected with the receptacle and having a Venturi shaped passage and a main passage by-passing the Venturi shaped passage for dividing flow of a pressure medium through said head, said head having a rotor chamber in the main passageway, a rotor in said chamber adapted to be actuated by velocity flow through the main passageway, a shaft journalled in said head and connected with the rotor, said shaft having a spiral portion depending into the receptacle for elevating the lubricant, a fitting carried by the head and having an axial passage passing the shaft and connected with the Venturi passage, a cup suspended from the fitting in receiving relation with the spiral portion of the shaft, said fitting having an annular groove and a radial port connecting the groove with the axial passage, and a capillary sleeve surrounding the fitting and having a portion depending into the cup for conducting the lubricant from the cup to said groove for aspiration into the Venturi shaped passage.

9. A lubricator including a receptacle for containing a lubricant, a head connected with the receptacle and having a Venturi shaped passage and a main passage by-passing the Venturi shaped passage for dividing flow of a pressure medium through said head, said head having a rotor chamber in the main passageway, a rotor in said chamber adapted to be actuated by velocity flow through the main passageway, a shaft journalled in said head and connected with the rotor, said shaft having a spiral portion depending into the receptacle for elevating the lubricant, a fitting carried by the head and having an axial passage passing the shaft and connected with the Venturi passage, a cup suspended from the fitting in receiving relation with the spiral portion of the shaft, said fitting having an annular groove and a radial port connecting the groove with the axial passage, a capillary sleeve surrounding the fitting and having a portion depending into the cup for conducting the lubricant from the cup to said groove for aspiration into the Venturi shaped passage, said head having a duct connecting the receptacle with the one of said passageways for supplying pressure medium to the lubricant receptacle, and means for discharging pressure medium from the receptacle responsive to aspirating effect of the pressure medium in the Venturi shaped passage for limiting the amount of lubricant aspirated into the pressure medium.

10. A lubricator including a receptacle for containing a lubricant, a head connected with the receptacle and having a Venturi shaped passage and a main passage by-passing the Venturi shaped passage for dividing flow of a pressure medium through said head, said head having a rotor chamber in the main passageway, a rotor in said chamber adapted to be actuated by velocity flow through the main passageway, a shaft journalled in said head and connected with the rotor, said shaft having a spiral portion depending into the receptacle, aspirating means carried by the head and having an inlet and outlet into the Venturi shaped passage, a cup in position to receive lubricant elevated by said spiral portion of the shaft, capillary means having a portion depending into the cup and having a portion carried by the aspirating means in covering relation with said inlet to the aspirating means for conducting lubricant from the cup to said aspirating means, said head having a duct connecting the rotor chamber with the receptacle for supplying pressure medium to the lubricant receptacle and having a duct connecting the lubricant receptacle with the aspirating means for admitting pressure medium to the aspirating means, and a valve in the last named duct to control the aspirating effect on the lubricant delivered to the Venturi passage.

11. A lubricator including a receptacle for containing a lubricant, a head connected with the receptacle and having a Venturi shaped passage and a main passage by-passing the Venturi shaped passage for dividing flow of a pressure medium through said head, said head having a rotor chamber in the main passageway, a rotor in said chamber adapted to be actuated by velocity flow through the main passageway, a shaft journalled in said head and connected with the rotor, said shaft having a spiral portion depending into the receptacle, aspirating means including a fitting carried by the head and having an annular lubricant receiving groove and having outlet into the Venturi passage, a tube housing the spiral portion of the shaft, a cup in position to receive lubricant from the tube that is elevated by said spiral portion of the shaft, and capillary sleeve encircling the fitting and having a portion in the cup to contact the lubricant and having a portion in covering relation with said annular groove for conducting lubricant from the cup to be aspirated through the outlet into the Venturi passage.

12. A lubricator including a receptacle for containing a lubricant, a head connected with the receptacle and having a Venturi shaped passage and a main passage by-passing the Venturi shaped passage for dividing flow of a pressure medium through said head, said head having a rotor chamber in the main passageway, a rotor in said chamber adapted to be actuated by velocity flow through the main passageway, a shaft journalled in said head and connected with the rotor, said shaft having a spiral portion depending into the receptacle, aspirating means including a fitting carried by the head and having an annular lubricant receiving groove and having outlet into the Venturi passage, a tube housing the spiral portion of the shaft, a cup in position to receive lubricant from the tube that is elevated by said spiral portion of the shaft, and capillary sleeve encircling the fitting and having a portion in the cup to contact the lubricant and having a portion in covering relation with said annular groove for conducting lubricant from the cup to be aspirated through the outlet into the Venturi passage, said head having a duct connecting the rotor chamber with the receptacle for supplying pressure medium to the lubricant receptacle.

13. A lubricator including a receptacle for containing a lubricant, a head connected with the receptacle and having a Venturi shaped passage and a main passage by-passing the Venturi shaped passage for dividing flow of a pressure medium through said head, said head having a rotor chamber in the main passageway, a rotor in said chamber adapted to be actuated by velocity flow through the main passageway, a shaft journalled in said head and connected with the rotor, said shaft having a spiral portion depending into the receptacle, aspirating means including a fitting carried by the head and having an annular lubricant receiving groove and having outlet into the Venturi passage, a tube housing the spiral portion of the shaft, a cup in position to receive lubricant from the tube that is elevated by said spiral portion of the shaft, capillary sleeve encircling the fitting and having a portion in the cup to contact the lubricant and having a portion in covering relation with said annular groove for conducting lubricant from the cup to be aspirated through the outlet into the Venturi passage, said head having a duct connecting the rotor chamber with the receptacle for supplying pressure medium to the lubricant receptacle, said head having a duct connecting the lubricant receptacle with the aspirating means for admitting pressure medium to the aspirating means, and a valve in the last named duct for controlling the aspirating effect on the lubricant delivered to the Venturi passage.

14. In a lubricator for feeding lubricant to a pressure medium, the combination of means for containing a body of lubricant and having a main flow duct and a secondary duct for said pressure medium, aspirating means in said secondary duct for feeding lubricant into the flow of pressure medium, capillary means for feeding lubricant to the aspirating means, a pump having an inlet connection with a lubricant containing means and an outlet connection with said capillary means for supplying lubricant from said lubricant containing means to the capillary means, means in the main flow duct and actuated by flow of pressure medium through said duct for actuating the pump, means for admitting a portion of the pressure medium to the body of lubricant to promote flow of lubricant to the pump, and valve means for admitting pressure medium from the pressure medium supply acting on the lubricant into the aspirating means for controlling the amount of lubricant aspirated from the capillary means.

PETER KETELSEN.

References Cited in the file of this patent

UNITED STATES PATENTS

| Number | Name | Date |
|---|---|---|
| 1,615,594 | Marcell | Jan. 25, 1927 |
| 2,189,391 | Bowdish | Feb. 6, 1940 |
| 2,466,246 | Ketelsen | Apr. 5, 1949 |
| 2,565,691 | Ketelsen | Aug. 28, 1951 |

FOREIGN PATENTS

| Number | Country | Date |
|---|---|---|
| 546,368 | Great Britain | July 9, 1942 |